March 13, 1951   F. W. McQUISTON, JR., ET AL   2,545,239
RECOVERY OF GOLD OR SILVER
Filed Aug. 10, 1946
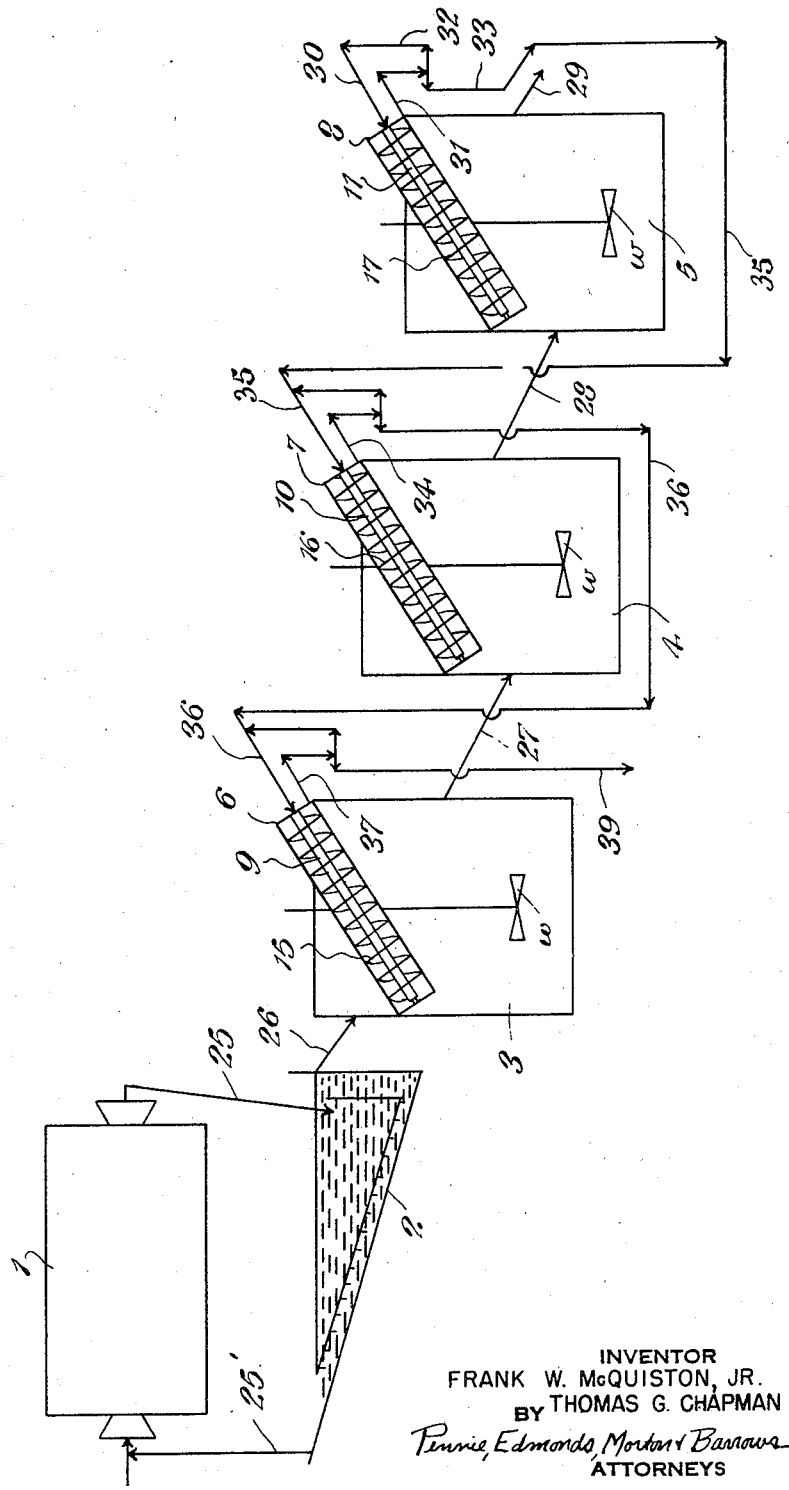
INVENTOR
FRANK W. McQUISTON, JR.
THOMAS G. CHAPMAN
BY
Pennie, Edmonds, Morton & Barrows
ATTORNEYS Patented Mar. 13, 1951

2,545,239

UNITED STATES PATENT OFFICE 2,545,239

RECOVERY OF GOLD OR SILVER

Frank W. McQuiston, Jr., Ouray, Colo., and Thomas G. Chapman, Tucson, Ariz.

Application August 10, 1946, Serial No. 689,676

7 Claims. (Cl. 75—106)

This invention relates to the recovery of gold or silver from cyanide solutions with activated carbon, and has for its object the provision of an improved method and apparatus for the recovery of such metals. More particularly, our invention pertains to the treatment of cyanide solutions containing gold or silver, especially cyanide solutions in pulp, with coarse, dense activated carbon and comprises an improved method in which we maintain control over the carbon by confining the carbon within the solution during adsorption.

In the copending application of Frank W. McQuiston, Serial Number 687,896, filed Aug. 2, 1946, now abandoned, is described a method of using coarse, dense activated carbon for the recovery of gold or silver dissolved in cyanide solutions. This invention employs similar activated carbon in operations in which we confine the carbon and control its intermingling in the solution.

Our invention provides apparatus means for intermingling the solution and carbon while maintaining control over the carbon and ultimately separating the metal-laden carbon from the solution. In our present preferred embodiment of the invention, we provide several connected vessels through which a pulp containing the cyanide solution flows in series, preferably with means for agitating the pulp in each vessel, a perforated member in each vessel for confining the activated carbon while the pulp is being agitated in contact with the carbon, and means for moving the carbon through each vessel and from vessel to vessel, preferably in countercurrent to the flow of the pulp, without letting the carbon loose in the pulp.

The single figure of the accompanying drawing illustrates more or less diagrammatically an arrangement of apparatus embodying the invention which may be used advantageously in carrying out a method of our invention.

The apparatus illustrated in the drawing comprises a grinder 1, such as a ball mill, any suitable standard type classifier 2, such as the Dorr, and pulp-receiving vessels 3, 4 and 5 which are interconnected for the flow of pulp in series therethrough. Each vessel has a power-driven paddle wheel W for agitating the pulp. Any suitable troughs, pipes, conveyors, or the like may be used for transferring the carbon and the pulp through the system. For convenience, these members shall be referred to merely as "conduits."

In accordance with our invention, as perforated members for receiving the carbon, we mount in each vessel a perforated cylinder 6, 7 and 8 which is partly or totally immersed in the pulp. While we show the cylinders in inclined positions, we may mount them horizontally in the vessels. For example, we may revolve in the pulp cylindrical screens with attached interior screws to feed the carbon through from one end to the other and discharge it into a conduit. We may submerge or partly submerge in the pulp a perforated container of any suitable shape, for example one rectangular in cross-section, and move the carbon therethrough from one end to the other by any suitable mechanical device such as the rakes used in Dorr classifiers. The vessels 3, 4 and 5 are maintained almost full of pulp and the continuous agitation prevents short circuiting in flowing through the system. The cylinders may be of perforated metal plate or a screen having openings which are smaller than the minimum size of carbon particles used in the operation. Inside the cylinders, hollow trunnions 9, 10 and 11 are suitably mounted in bearings and are rotated by power means at the upper ends (not shown). Worm screws 15, 16 and 17 are mounted on the outside of the trunnions and rotate therewith.

The apparatus illustrated in the drawings may be used very effectively in carrying out a method of the invention as follows: Any gold- or silver-bearing ore or like material, an alkaline material such as calcium oxide, and a solution of sodium cyanide are introduced more or less continuously into the ball mill. The ground product from the ball mill is passed through conduit 25 into the classifier 2. A perforated cylinder may also be operated any place in the pulp of conduit 25. The finely ground and suspended particles of ore in the cyanide solution overflow through conduit 26 into vessel 3 as the pulp treated by our invention. The coarser particles which settle to the bottom of the classifier are carried upwardly by the usual rake and are returned through conduit 25' to the ball mill for further grinding. The pulp flows in series from vessel 3, through conduit 27 into vessel 4, from vessel 4 through conduit 28 to vessel 5 and is discharged as tailings through conduit 29. In each of these vessels, the pulp is thoroughly agitated by the paddle wheel W.

The activated carbon must not only be sufficiently coarse, preferably varying from 48 mesh (Tyler Series) to 1 inch particles, that it does not pass through the perforations in the cylinders to any appreciable extent but it must be sufficiently hard that it does not pulverize as a result of attrition in passing through the operation. We appreciate that some carbon will be lost through the perforations due to imperfect screening or breakage but we aim to minimize this condition because the carbon thus lost will result in a loss of metal adsorbed thereon. Carbon formed of dense woods, nut shells or fruit pits, or coke derived from anthracite coal or petroleum products is suitable for use in the operation. The fresh carbon is introduced through conduit 30 into the hollow trunnion 11 through which it descends to an opening at the bottom. It is there picked up by the worm 17 and conveyed upwardly through the cylinder to an overflow at the top and is discharged into conduit 31. This fresh carbon has the maximum capacity to adsorb the metals and is brought into contact with a solution having the minimum metal content. The cyanide solution leaving conduit 29 to be discharged as tailings is practically stripped of its metal content by reason of its contact with the fresh activated carbon in cylinder 8.

From conduit 31 a part of the carbon may be returned through conduit 32 to conduit 30, while the remainder is sent through conduit 35 to the trunnion 10 in cylinder 7. The carbon passes through cylinder 7, as previously described, and is discharged in conduit 34. A part of this carbon may be returned to the trunnion through conduit 35, while the remainder is sent through conduit 36 into trunnion 9 of cylinder 6. The carbon passes through cylinder 6, as previously described, and is discharged through conduit 37 from which a part may be returned to the trunnion through conduit 36, while the remainder is removed from the system as metal-laden carbon through conduit 39. The metal may be recovered from the carbon in any suitable way, such as by leaching or smelting. The solution which enters vessel 3 has the maximum metal content and the carbon which enters cylinder 6 is approaching its maximum metal content. This relationship enables the carbon to acquire its maximum load of metal when discharged from cylinder 6.

It will be apparent that the invention involves the forcing of a mass of coarse dense particles of activated carbon through gold- or silver-bearing cyanide solutions and that the carbon is prevented from intermingling freely with the pulp. In other words, the carbon is confined in the solution and not loose. The agitation in each vessel brings the pulp into contact with the carbon since the pulp is circulated through the perforations in the cylinders. The invention, accordingly, provides an efficient method of moving the carbon through the pulp while it is confined and effecting a final separation of metal-laden carbon from the pulp without introducing complicated separatory operations, such as flotation.

In our preferred operation as described in connection with the apparatus of the drawing, we treat the cyanide solution of a pulp with the carbon, and dissolution and adsorption occur simultaneously. In certain ores the solution of gold or silver is so slow, requiring, say, 48 hours contact with the cyanide solution, that it is preferable to carry out dissolution and adsorption, wholly or partly, in separate operations. We may use an arrangement of apparatus, such as shown in the drawings, in which a perforated member is used only in the last stage, that is, vessel 5. This eliminates undue agitation and breakage of the carbon during dissolution.

We claim:

1. In the recovery of gold or silver from a cyanide solution by adsorption on activated carbon, the improvement which comprises mechanically moving a mass of coarse particles of activated carbon while confined in a perforated member through the solution and simultaneously agitating the solution during adsorption to bring it into contact with the carbon.

2. In the recovery of gold or silver from a cyanide solution by adsorption on activated carbon, the improvement which comprises mechanically moving coarse particles of activated carbon through the solution during adsorption, said carbon being confined to prevent free intermingling with the solution, simultaneously agitating the solution to bring it into contact with the carbon, and separating the carbon from the solution while in its coarse state.

3. In the recovery of gold or silver from the cyanide solution of an ore pulp in which said metals are removed from solution by adsorption on activated carbon, the improvement which comprises moving a mass of coarse activated carbon which is plus 48 mesh through a body of pulp in a vessel, flowing the pulp from another vessel into and through the first-mentioned vessel, passing the carbon from the first-mentioned vessel to the last-mentioned vessel in countercurrent to the flow of pulp, confining the carbon in each vessel to prevent free intermingling with the pulp, agitating the pulp in the vessels, and removing metal-laden carbon from the pulp for recovery of the metal.

4. In the recovery of gold or silver from the cyanide solution of an ore pulp in which at least one of said metals is removed from solution by adsorption on activated carbon, the improvement which comprises mechanically moving a mass of coarse carbon through a perforated member immersed in the pulp, said carbon consisting of particles sufficiently larger than the perforations in the member that the particles do not pass through, and agitating the pulp to bring it into contact with the carbon in the member during the adsorption period.

5. In the recovery of gold or silver from the cyanide solution of an ore pulp in which at least one of said metals is removed from solution by adsorption on activated carbon, the improvement which comprises mechanically moving a mass of coarse carbon having particles from 48 mesh to 1 inch size through a perforated member immersed in the pulp, agitating the pulp in contact with the member and the carbon therein during the adsorption of the metal, passing the carbon from said perforated member to another perforated member in countercurrent to the flow of pulp from one member to another, and removing metal-laden carbon from the last perforated member.

6. In the recovery of gold or silver from the cyanide solution of an ore pulp in which at least one of said metals is removed from solution by adsorption on activated carbon, the improvement which comprises mechanically moving a mass of coarse carbon through a perforated member partly immersed in the pulp, said carbon consisting of particles sufficiently larger than the perforations in the member that the particles do not pass through, and agitating the pulp to bring it into contact with the carbon in the member during the adsorption period.

7. In the recovery of gold or silver from the cyanide solution of an ore pulp in which at least one of said metals is removed from solution by adsorption on activated carbon, the improvement which comprises mechanically moving a mass of coarse carbon having particles from 48 mesh to 1 inch size through a perforated member partly immersed in the pulp, agitating the pulp in contact with the member and the carbon therein during the adsorption of the metal, passing the carbon from said perforated member to another perforated member in countercurrent to the flow of pulp from one member to another, and removing metal-laden carbon from the last perforated member.

FRANK W. McQUISTON, Jr.
THOMAS G. CHAPMAN.

REFERENCES CITED

The following references are of record in the file of this patent:

UNITED STATES PATENTS

| Number | Name | Date |
|---|---|---|
| 1,024,230 | Turner et al. | Apr. 23, 1912 |
| 1,601,497 | Greene | Sept. 28, 1926 |
| 2,147,009 | Chapman | Feb. 14, 1939 |
| 2,315,187 | Chapman | Mar. 30, 1943 |
| 2,476,420 | Krebs | July 19, 1949 |

OTHER REFERENCES

Journal of the Chemical, Metallurgical, and Mining Society of South Africa, vol. 12, July 1911–June 1912, page 102.